United States Patent [19]

Madigan et al.

[11] Patent Number: 5,349,156
[45] Date of Patent: Sep. 20, 1994

[54] SENSING OF GAS METAL ARC WELDING PROCESS CHARACTERISTICS FOR WELDING PROCESS CONTROL

[75] Inventors: R. Bruce Madigan, Longmont; Timothy P. Quinn, Boulder, both of Colo.

[73] Assignee: The United States of America as represented by the Secretary of Commerce, Washington, D.C.

[21] Appl. No.: 65,393

[22] Filed: May 21, 1993

Related U.S. Application Data

[63] Continuation-in-part of Ser. No. 891,840, Jun. 1, 1992, Pat. No. 5,221,825.

[51] Int. Cl.$^5$ .............................. B23K 9/095
[52] U.S. Cl. ................... 219/130.01; 219/130.21; 219/137.71
[58] Field of Search ............... 219/130.01, 130.21, 219/137 PS, 137.71

[56] References Cited

U.S. PATENT DOCUMENTS

| | | |
|---|---|---|
| 3,236,997 | 2/1966 | Johnson et al. . |
| 3,262,006 | 7/1966 | Sciaky et al. . |
| 3,370,151 | 2/1968 | Normando . |
| 3,679,865 | 7/1972 | Jesnitzer et al. ............... 219/130.01 |
| 3,864,542 | 2/1975 | Fletcher et al. . |
| 4,093,844 | 6/1978 | Fellure et al. . |
| 4,280,137 | 7/1981 | Ashida et al. . |
| 4,375,026 | 2/1983 | Kearney . |
| 4,446,354 | 5/1984 | Kearney . |
| 4,595,820 | 6/1986 | Richardson . |
| 4,672,174 | 6/1987 | Kondo . |
| 4,943,701 | 7/1990 | Nakajima et al. . |
| 5,086,207 | 2/1992 | Deam . |

OTHER PUBLICATIONS

Adam et al, "Sensing of GMAW Droplet Transfer Modes Using an ER100S-1 Electrode", *Welding Research Supplement*, Mar. 1990, pp. 103-108.

Heald et al, "Droplet Transfer Modes For a Mill 100S-1 GMAW Electrode", NISTIR 3976, Oct. 1991, pp. 1-22.

Liu et al, "Metal Transfer Mode In Gas Metal Arc Welding" ASM Reprint, May 1989.

Primary Examiner—Clifford C. Shaw
Attorney, Agent, or Firm—Michael M. de Angeli

[57] ABSTRACT

An gas metal arc welding (GMAW) process is monitored by disposing a light intensity sensor in the vicinity of the arc, such that the output signal from the sensor is responsive to the intensity of the arc. The arc light intensity is analyzed to determine the arc length, and to determine of the mode of metal transfer and whether the welding process is proceeding as intended.

16 Claims, 4 Drawing Sheets

SENSING OF GAS METAL ARC WELDING PROCESS CHARACTERISTICS FOR WELDING PROCESS CONTROL

CROSS REFERENCE TO RELATED APPLICATION

This application is a continuation-in-part of Ser. No. 07/891,840, filed Jun. 1, 1992 now U.S. Pat. No. 5,221,825.

BACKGROUND OF THE INVENTION

1. Field of the Invention

The present invention relates generally to sensing welding process characteristics, and more particularly to the sensing of gas-metal-arc welding process characteristics in order to facilitate control of the welding process, and avoid flaws due to departure from desired process characteristics.

2. Description of the Prior Art

Gas-metal-arc welding (GMAW) is a process in which a consumable electrode is continuously fed into an electric arc. The electrode carries the current powering the arc and provides the filler metal while the arc is the heat source for melting the base metal to be welded and the filler metal added to the weld. The welding current is applied between a contact tube in the vicinity of the arc through which the electrode slides and the workpiece. An inert or slightly reactive shielding gas is used to displace the atmosphere from the arc and the weld pool until solidification occurs, such that the molten metal does not react with the high oxygen and nitrogen levels in the atmosphere. The shielding gas also ionizes to form a high-temperature plasma which carries the current. A mixture of argon with additions of oxygen or carbon dioxide is generally used for welding low alloy steels.

Most GMAW is performed with a constant voltage power source, such that the arc length is self-regulating. If some perturbation causes the arc length to increase, the following steps bring the arc length into equilibrium: the circuit resistance increases; the arc current decreases; the resulting lower current melts the electrode more slowly than the electrode feed rate; and the arc length decreases to a stable length. If some perturbation causes the arc length to decrease, the circuit resistance decreases and the system returns to equilibrium through the opposite sequence.

A more comprehensive description of GMAW is included in National Institute of Standards and Technology Publication No. NISTIR 3976, by Heald, Madigan, Siewert and Liu, entitled "Droplet Transfer Modes for a MIL 100 S-1 GMAW Electrode", published in October, 1991. This publication is hereby incorporated into the present application by reference. As described in detail in NISTIR 3976, metal transfer in GMAW takes place in one of three modes: short circuit (wherein the arc is periodically extinguished and reignited as the advancing electrode contacts the work), globular transfer (where relatively large droplets are transferred at relatively low frequency), and spray transfer (where relatively small droplets are transferred at relatively high frequency). Further, spray transfer may take place in drop spray, streaming spray or rotating spray modes; for the purposes of the present invention, these three modes of spray transfer are essentially equivalent.

For reasons fully described in NISTIR 3976, most production GMAW is carried out in the spray transfer mode. Many GMAW power supplies provide pulses in the welding current and/or voltage, to encourage proper metal transfer.

The art is replete with attempts to monitor various welding parameters to predict and control GMAW, in particular the mode of metal transfer. NISTIR 3976 summarizes many such attempts. As reported in NISTIR 3976, the mode of metal transfer which takes place in any particular welding process is a complex function of at least the electrode feed rate, the arc voltage, the welding current, and the contact tube to work distance (CTWD). Briefly, automated control of GMAW is complicated because those process variables which can be directly measured and controlled, namely, the CTWD, the total voltage between the power supply and workpiece, and the welding current, do not directly reflect the proper performance of the welding process.

More specifically, the CTWD (which can be measured and controlled) is the sum of the arc length and the electrode's extension from the contact tube (or "stickout"). The arc length and electrode extension are of separate relevance to the weld characteristics such as bead height and width, penetration, and undercut, such that measurement of the CTWD does not allow direct control of any of these parameters. Further, the arc voltage, which cannot be directly measured, is but one component of the measured contact-tube-to-workpiece voltage, the other components being the voltage drop between the contact tube and the electrode, and that along the length of the electrode extension. Finally, the inductive nature of the circuit limits the utility of measurement of the welding current as a predictor of the mode of metal transfer. Accordingly, the transfer mode, the electrode extension and the arc length are complex and interdependent functions of the total voltage, the current, the electrode feed speed, and the CTWD.

The contact tube, the electrode extension and the arc are all elements of a GMAW electrical circuit. Changes in the resistance of any element affect the electrical impedance of the circuit. Metal transfer across the arc is characterized by repetitive events, each event modulating the circuit impedance in a characteristic pattern.

As noted, it is well known to use a pulsed power source for enhanced droplet detachment in GMAW. Examples of pulsed GMAW power sources are found in U.S. Pat. No. 3,864,542 to Fletcher et al and U.S. Pat. No. 4,943,701 to Nakajima et al. The signal from such a source exhibits significant current and voltage pulses to stimulate the formation and detachment of droplets at the electrode tip. Such pulsed power sources typically also include internal logic circuitry for changing the pulse frequency along with the wire feed rate. Proper characterization of the various droplet transfer modes and events that interfere with stable transfer might permit voltage or current records derived from sensors used to monitor the arc and to be analyzed to evaluate weld quality in real time and to make corrections as necessary. However, apparatus to do so is not presently available.

Some automated welding systems employ "through-the-arc sensing", that is, monitor the arc voltage and/or current. This technique typically uses a low-frequency sensing strategy, wherein the arc voltage is measured repetitively. The low sampling rate of these conventional systems limits the response time of the welding control system to correct flaws. For example, seam tracking algorithms (that is, the control programs employed by welding systems that automatically follow a joint between two members) look for changes in the mean welding current or voltage (e.g., over a period of several tenths of seconds) to detect departure of the welding unit from the seam.

The system described in the patent issued to Fletcher et al varies the frequency of the DC welding pulses applied to the arc while monitoring the arc voltage to determine the frequency at which the maximum arc voltage is observed. Fletcher et al report that operating the welding power supply at that frequency provides the optimal welding characteristics. However, the Fletcher system is intended for gas tungsten arc welding ("GTAW") (also known as tungsten inert gas, or "TIG", welding), wherein the arc is formed between a nonconsumable tungsten electrode and the workpiece. Accordingly, in GTAW, the arc length is constant; by comparison, in GMAW, as addressed by this invention, the arc length fluctuates in a more complex manner. Accordingly, in GTAW the arc voltage is essentially constant, while in GMAW the arc voltage varies considerably. Hence, the teachings of Fletcher et al are not directly applicable to GMAW.

Ideally, a computer-controlled GMAW system would detect signals from various sensors monitoring the key variables in the welding process, determine the mode of metal transfer, for example, by comparing the monitored variables to preset values, and alter the welding process accordingly by sending control signals to the welding power source. Control actions responsive to the sampled signals would be developed rapidly, so that possible flaws in the welding process might be detected on a real-time basis and the parameters adjusted as necessary to correct the on-going welding process. Only in this manner can automated welding be carried out without an unacceptable number of unsatisfactory welds.

As noted, detection of meaningful characteristics of the welding process is critical in determining whether an ongoing welding process should be altered or terminated. For example, often GMAW is intended to be carried out in the spray transfer mode; the spray transfer mode exhibits characteristic electrical signals from which weld quality information can be obtained. It is likewise important to detect characteristic patterns of electrical signals associated with the short circuit and globular transfer modes. Proper signal processing would allow detection of the transfer mode, droplet transfer frequency, and droplet transfer stability. If welding is being carried out in the short circuit transfer mode, the frequency of the short circuits will indicate if appropriate voltage or current levels are being output by the GMAW power source.

More specifically, as indicated above it would be desirable to provide an automated welding control system capable of monitoring the weld parameters which control the mode of metal transfer from the electrode to the workpiece. As indicated above, metal transfer in GMAW may take place in a short circuiting mode in which the electrode periodically physically touches the workpiece, thus shorting and extinguishing the arc; a globular transfer mode in which the arc is continuous but metal is transferred as a relatively unstable series of large globules; and a spray transfer mode, wherein smaller droplets are transferred at a higher frequency. The spray transfer mode is generally preferred for production rate welding and therefore it is desired to provide a control system which can monitor the welding operation to determine whether spray transfer is occurring and correcting the welding parameters as necessary.

It is understood that the mode of metal transfer is determined at least in part by the arc length. In GMAW, the arc length tends to fluctuate both randomly, for example, due to irregularities in the workpiece causing variation in the CTWD, and periodically, that is, corresponding to detachment of metal droplets from the electrode. Moreover, although the arc length could be determined if the voltage across the arc itself were known, as indicated above in GMAW it is only possible as a practical matter to monitor the voltage supplied between the contact tube and the workpiece. However, the arc voltage, the parameter of real interest, is but one of several voltages which sum to the total voltage supplied, the others being the voltage between the contact tube and the electrode, and the voltage drop along the length of the electrode extension. As the consumable electrode is fed into the arc during the GMAW process, the electrode extension varies quite substantially with droplet detachment and with variation in the CTWD. The voltage drop between the electrode and the contact tube may also vary due to intermittent contact and the like.

It would clearly be desirable to provide a simple and reliable apparatus and method for determining the arc length, such that the arc length could be employed by the control circuitry of a commercial welding apparatus as a direct and objective measure of the welding process, in order to determine whether the arc welding process was proceeding in a satisfactory manner. Typically the arc current and/or electrode feed rate would be varied to control the arc length.

The same control process would be useful in control of other welding processes employing a continuous consumable electrode fed automatically into the region of the arc, for example, flux-cored arc welding, in which the arc may or may not be shielded by an inert gas as in GMAW, but is protected in part by a flux provided in the core of the continuous electrode.

OBJECTS AND SUMMARY OF THE INVENTION

It is therefore an object of the invention to provide a automated control system for gas metal arc welding and other forms of continuous consumable electrode welding such as flux-cored arc welding, wherein a welding parameter is sensed which is directly responsive to the arc length, such that the arc voltage and other pertinent welding parameters can be controlled in order to ensure proper metal transfer.

It is a further object of the invention to provide a welding control system whereby the arc voltage may be determined as a function of the arc length, such that variations in electrode extension and variations in the voltage between the contact tube and the electrode are eliminated as sources of uncertainty in determining the arc voltage.

These and other objects of the invention which will appear as the discussion below proceeds are satisfied by the present invention, whereby an automated welding control system comprises a sensor adapted to measure the intensity of light emitted by the arc during a welding process. Typically, the welding current and voltage will be measured as well. The intensity of the light emitted for a given welding current has been determined by the inventors to be a function of the arc length and hence a function of the actual arc voltage. If the arc current is measured as well as the arc light intensity, a reliable indication of the arc length may be derived. Because the arc light intensity is a function of both arc length and arc current, solely monitoring the arc light intensity without measurement of the arc current is not sufficient to determine the arc length. Finally, monitoring the arc length also allows automatic adjustment of the welding parameters as may be necessary to maintain constant arc length.

Use of the arc light sensor alone does however provide a direct determination of the mode of metal transfer. Fourier analysis of the changes in arc light allows the transfer frequency to be determined. The transfer frequency is a direct measure of the type of metal transfer mode. Monitoring of the transfer frequency allows automatic adjustment of the welding parameters to maintain the desired transfer mode.

BRIEF DESCRIPTION OF THE DRAWINGS

The invention will be better understood if reference is made to the accompanying drawings, in which.

DESCRIPTION OF THE PREFERRED EMBODIMENTS

Figure 1:
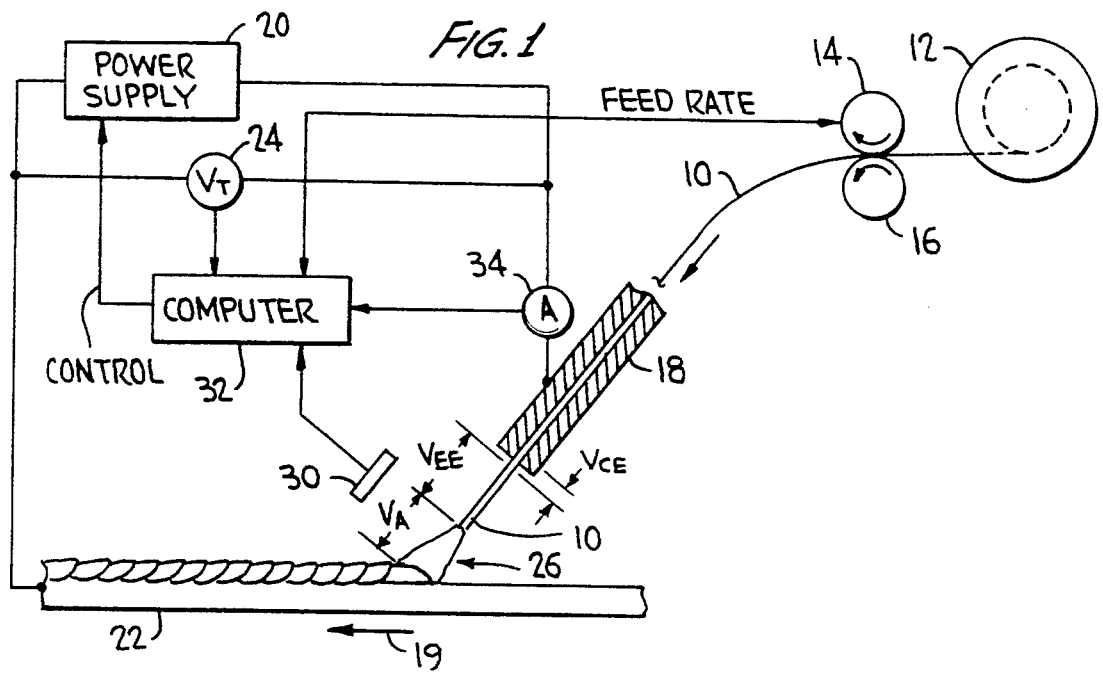
FIG. 1 shows schematically a system for welding according to the present invention.

FIG. 1 shows as indicated above a schematic diagram of an automated system for gas metal arc or other continuous consumable electrode welding, such as flux-cored arc welding, according to the invention. A continuous consumable electrode 10 is driven from a supply reel 12 into the vicinity of an arc 26 by drive rolls 14 and 16, as is conventional in the art. Typically the workpiece is moved continuously with respect to the vicinity of the arc 26, as indicated by arrow 19. In the vicinity of the arc 26, the electrode 10 passes through a copper contact tube 18. If GMAW is being carried out, a shielding gas is supplied to the vicinity of the arc by a coaxial tube (not shown) around the contact tube 18. A welding power supply 20 is connected between the contact tube 18 and the workpiece 22. Accordingly, the total welding voltage $V_T$ provided by the power supply may be measured by a voltmeter 24 connected across the leads connecting the power supply 20 to the contact tube 18 and to the workpiece 22.

As indicated above, the total supplied voltage $V_T$ measured by voltmeter 24 is not indicative of the actual arc voltage $V_A$ across the arc 26. Instead the arc voltage $V_A$ is a component of the total voltage $V_T$, as measured by voltmeter 24. $V_T$ includes not only the arc voltage $V_A$ but also a component $V_{CE}$ between the contact tube 18 and the electrode 10 due to imperfect contact therebetween, and a further component $V_{EE}$ due to voltage drop along the extension or "stickout" of the electrode. As further indicated above, both $V_{CE}$ and $V_{EE}$ vary in an unmeasurable fashion during a typical welding process. $V_{CE}$ varies due to movement of the electrode 10 through the contact tube 18. $V_{EE}$ varies with the length of the electrode extension; in particular, as the electrode sticks further out of the contact tube 18, the voltage drop $V_{EE}$ along the length of the electrode increases substantially due to the high resistance of the electrode, which is heated by the high currents passing therethrough. As indicated above, the prior art has not suggested a way in which the actual arc voltage $V_A$ can be determined and used to control the welding process parameters to ensure the proper mode of metal transfer.

According to the present invention, the intensity of light emitted by the arc is measured by a light sensor 30 disposed so as to be illuminated by radiation from the arc. Sensor 30 may be a photodiode or other light sensor responsive to radiation of wavelengths chosen in accordance with the weld process to be measured, that is, including both visible and infrared and ultraviolet radiation, as desired. It is within the scope of the invention to provide a sensor 30 sensitive to specific wavelengths of light characteristic of the material being welded. For example, a sensor 30 selectively sensitive to Fe or Mn emissions might be useful in monitoring welding of low alloy steels or the like. Sensor 30 may be intrinsically sensitive to specific wavelengths or may be provided with filters to ensure that only selected specific wavelengths reach the sensitized surface of the sensor 30.

Sensor 30 provides an output signal responsive to the intensity of radiation incident thereon, which signal is passed to a control computer 32. Control computer 32 may be any general purpose personal computer or the like programmed to monitor the intensity signal from sensor 30, as well as the voltage $V_T$ from voltage sensor 24 and also the welding current I as measured by an current sensor 34. Control computer 32 processes the signals thus supplied in a manner discussed in detail below, and provides corresponding control signals to welding power supply 20 as needed, and may also control the electrode feed rate as indicated at 36.

According to one aspect of the present invention, as detailed below, the intensity of illumination detected by sensor 30 and the arc current by sensor 34 are directly correlated to the arc length. Since the arc length is a function of the arc voltage as well understood in the art, the light intensity is thus proportional to the arc voltage $V_A$. This fact may be used by the computer 32 in controlling the welding parameters to ensure the welding process is being carried out properly. More particularly, as shown below, applicants have discovered that the change in intensity of the light from the arc is correlated with the mode of metal transfer; therefore, the intensity of light measured by sensor 30 can be used directly as a control parameter to ensure that the welding process proceeds in a satisfactory manner.

Figure 2:
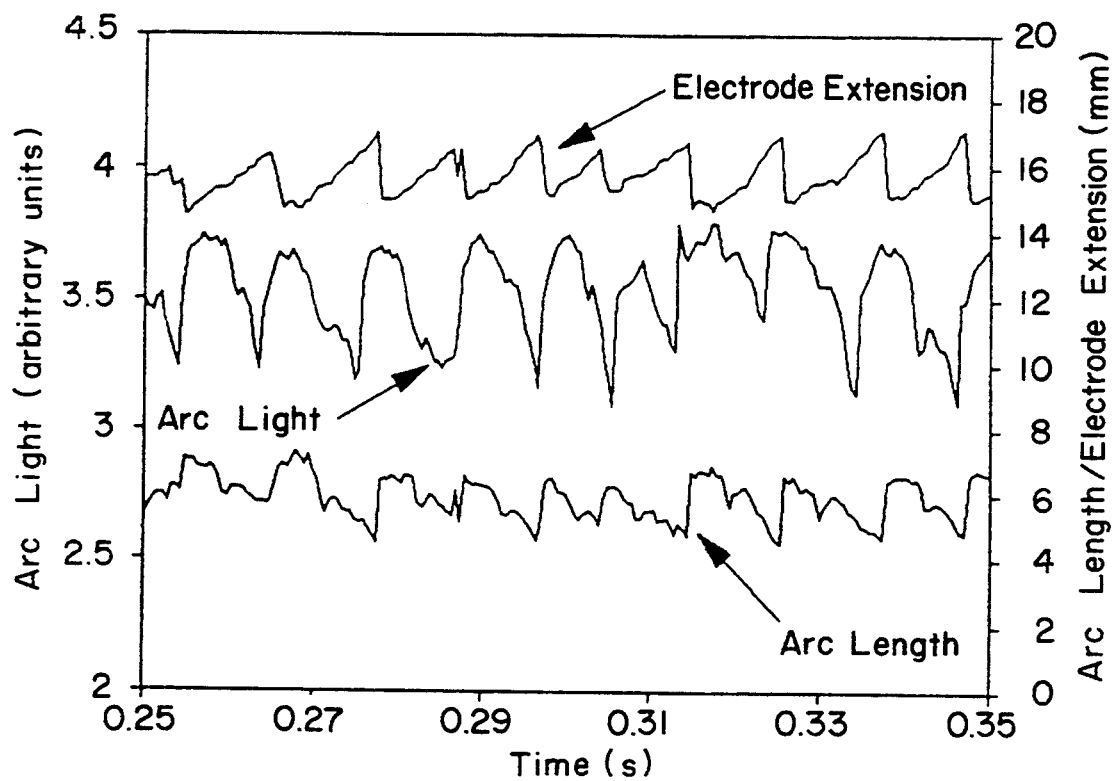
FIG. 2 shows results of experiments measuring the electrode extension, the arc light intensity, and the arc length as functions of time during GMAW in the drop spray transfer mode.

FIG. 2 shows experimental results obtained by the present inventors using an experimental arrangement generally as in FIG. 1. A conventional constant-voltage DC power supply 20 as described above was used, and was controlled such that metal transfer took place in the spray transfer mode. Power supply 20 did not provide pulses in the DC welding voltage or current.

FIG. 2 shows three traces recorded as functions of time during approximately 0.10 seconds of GMAW in the drop spray transfer mode. As labeled, the uppermost trace shows the electrode extension in millimeters, the central trace shows the intensity of light detected from the arc by sensor 30 in arbitrary units, and the lowermost trace shows the arc length, again in millimeters. The arc length and electrode extension were measured by inspection of a high speed video record of the arc.

As can be seen, a number of generally similar events were recorded. In each, the arc light intensity and the arc length are shown to repetitively reach maxima at approximately the same time, corresponding with minima in the electrode extension. (Note that the arc length and electrode extension will sum to the CTWD.) The video record further showed that the variations in arc length and electrode extension recorded in FIG. 2 correspond to the release of individual droplets of molten metal from the tip of the electrode 10. As indicated in FIG. 2, as the electrode is subsequently fed forward, the arc length and the arc light both decrease, while the electrode extension increases, until the next droplet is detached and the process is repeated.

Accordingly, analysis of the data displayed in FIG. 2 shows that the arc intensity reaches its maximum just as a droplet is transferred from the electrode 10 to the workpiece 22, at the same time the arc length reaches a maximum. More specifically, the record provided by FIG. 2 shows that the arc light intensity is an objective indicator of the arc length, such that the arc light intensity can in fact be monitored to determine the arc length.

Figure 3:
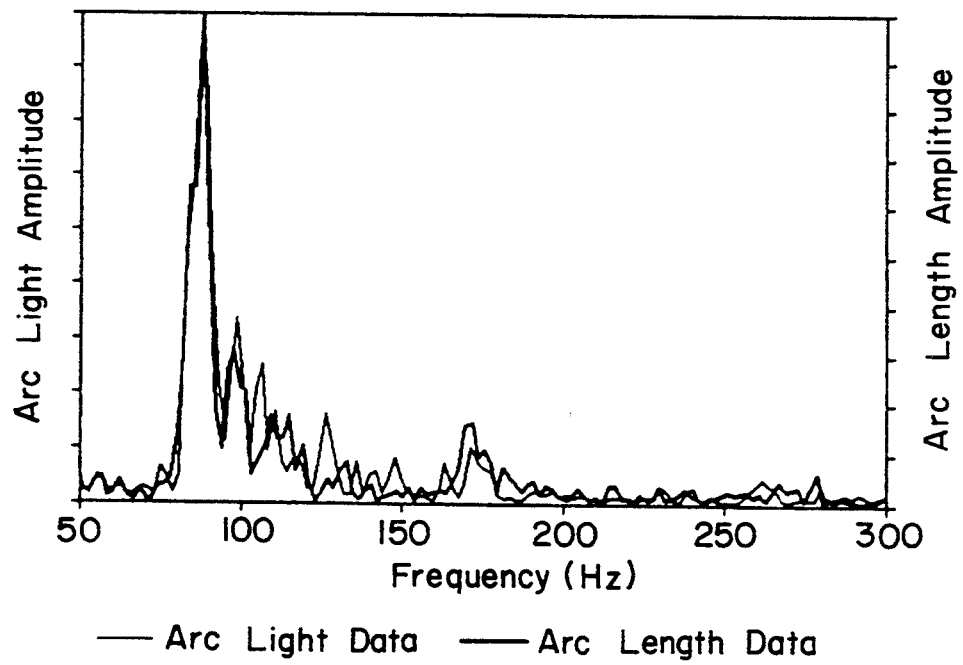
FIG. 3 shows a power spectrum density plot of arc light and arc length versus frequency during GMAW in the droplet transfer mode.
Figure 4:
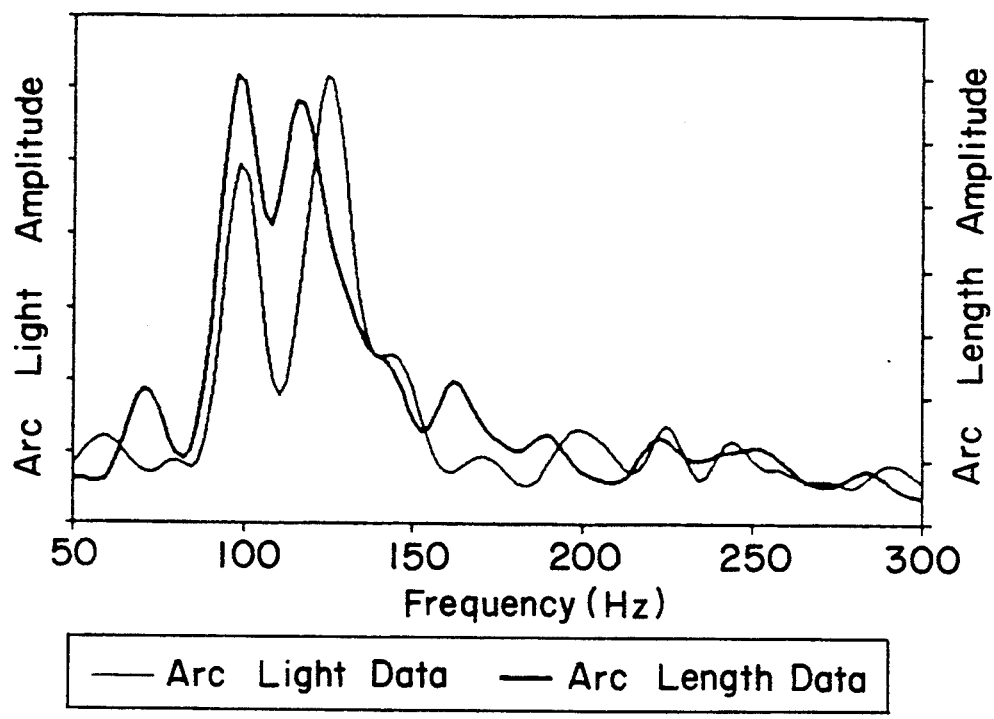
FIG. 4 shows a similar plot for GMAW near the droplet/spray transfer mode transition.
Figure 5:
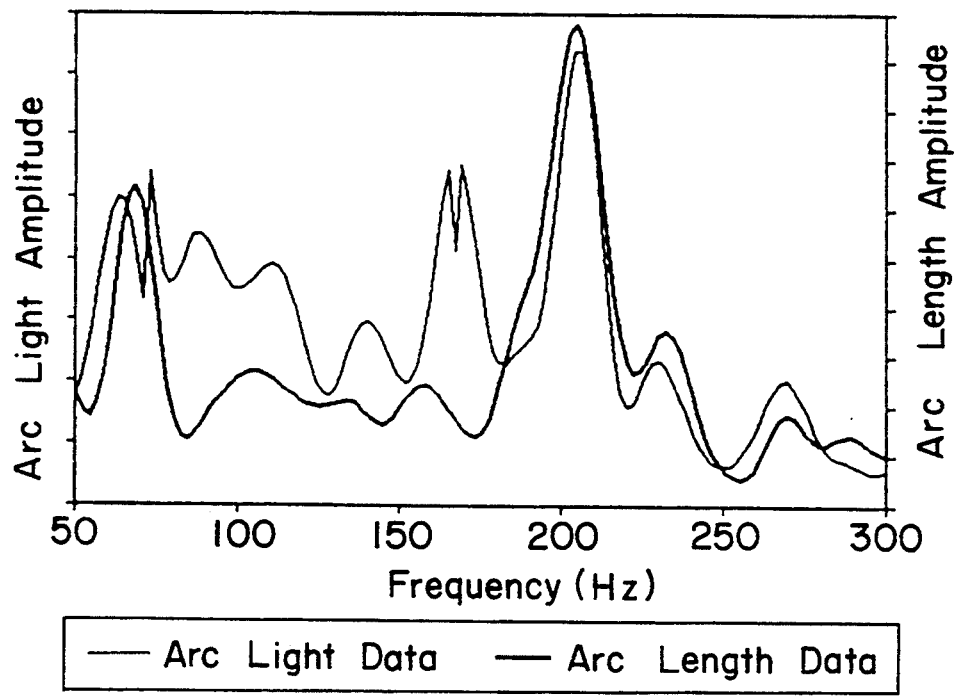
FIG. 5 shows a similar plot during GMAW in the spray transfer mode.

FIGS. 3, 4 and 5 show power spectrum density plots of the arc light and arc length as a function of frequency and illustrate the variation in drop transfer frequency experienced in different metal transfer modes. FIG. 3 shows a power spectrum density plot recorded during droplet transfer; as can be seen, the arc light and arc length reach maxima at a droplet transfer frequency on the order of 85 Hz. It can also be seen that the arc light and arc length of the power spectrum are very well correlated with one another; that is, FIG. 3 confirms that variation in the arc light amplitude corresponds to variation in the arc length, and is indicative of transfer of droplets from the electrode to the workpiece.

FIG. 4 shows similar plots taken during welding under conditions between the drop transfer and spray metal transfer modes. Here the arc light and arc length data are reasonably well correlated and maximized at frequencies between 90 and 130 Hz, indicating that, as might be expected, the droplet transfer frequency increases during this transition. Finally, FIG. 5 shows similar plots during spray transfer. Here the arc length and arc light spectrum are not quite as well correlated, although both reach a pronounced peak at around 200 Hz. It will therefore be appreciated that by determination of the rate of variation in the arc light intensity, that is, by measuring the frequency of variation in the arc light intensity, the mode of metal transfer may be effectively determined.

Figure 6:
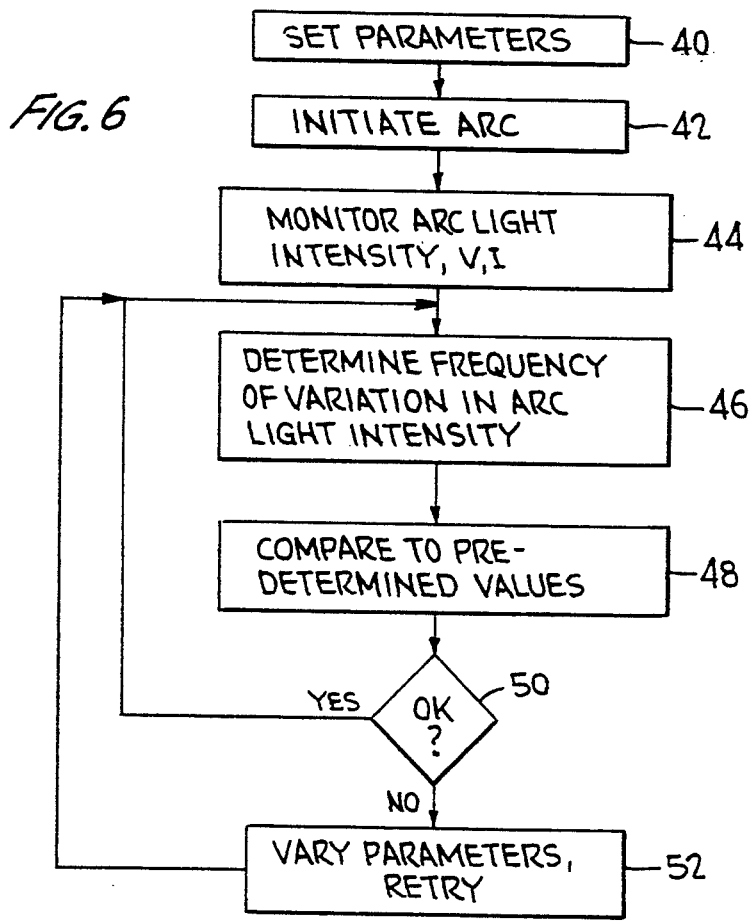
FIG. 6 shows a flowchart of typical steps carried out in the process of the invention.

FIG. 6 is a highly idealized flowchart showing the key steps in practice of an automated welding process according to the invention. As indicated at 40, the initial step in the welding process is to set the initial welding parameters, such as the total supplied voltage $V_T$, the welding current I, the electrode feed rate, the contact tube to work distance (CTWD), and the like. The arc is then initiated at 42. According to one important aspect of the invention, the arc light intensity is monitored at 44. Typically the supply voltage $V_T$ will also be measured by a voltmeter 24 across the leads of the power supply, while the current I delivered to the arc is measured by an ammeter 34. The signal from arc light intensity sensor 30 is passed to the computer 32 which determines the average value of and the frequency of variation in the arc light intensity, as indicated at 46. The average value of and the frequency of variation in the arc light intensity, together with the voltage and current if monitored, are compared at 48 to predetermined values chosen in accordance with the desired characteristics of the welding process. In a commercial welding system implementing the invention, such predetermined values may be chosen from values determined during laboratory experiments and supplied in tabular form to the user, or possibly stored in a memory device of known type comprised by computer 32.

If the measured values are determined to be appropriate in step 50, steps 46 and 48 are simply repeated iteratively during the welding process, to continually ensure that no change in the parameters need be made. If the parameters do not compare appropriately to the predetermined values in step 50, the parameters are varied at 52 in a iterative or predetermined fashion, and steps 46-50 are carried out again until the measured parameters coincide appropriately with the predetermined values in step 48.

Figure 7:
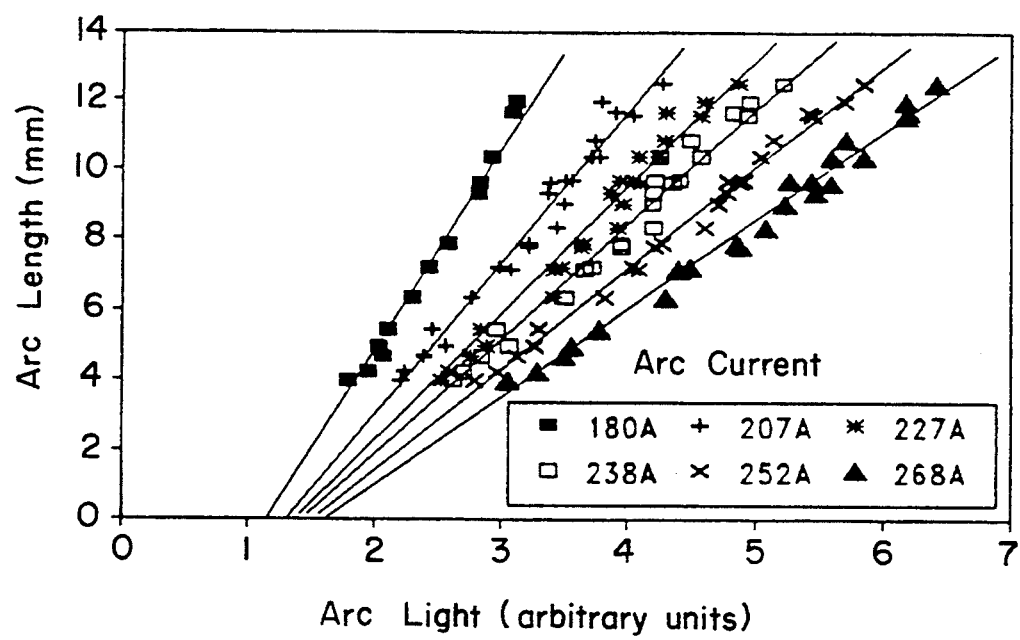
FIG. 7 shows a number of plots of arc length versus arc light intensity for arcs measured at differing welding current values.

FIG. 7 shows a plot of arc length versus arc light intensity for currents ranging from 180 A to 300 A and arc lengths from 4 mm to 12 mm. As the arc length increases for a given current, a proportional change in arc light intensity occurs; stated differently, FIG. 7 shows that for a given arc length, the arc light intensity increases proportionally as arc current increases A regression analysis was carried out to correlate the current and arc length to the arc light intensity. The independent variables used in the analysis were the product of current I and arc length L, and arc length L; the dependent variable was arc light intensity $\Psi$, related as follows:

$$\Psi = a_0 + a_1 LI + a_2 L \quad (1)$$

The regression analysis was carried out with 6997 points. The welding current I ranged from 180 to approximately 270 A, as shown, and the electrode feed speed ranged from 0.09 to 0.15 m/s which resulted in a range of supply voltages $V_T$ between 22 to 33 V, an arc light intensity range of 1.7 to 7.3 arbitrary units, and an arc length range of 3.9 to 12.5 mm. For I in A, $\Psi$ in arbitrary units and L in millimeters, the coefficients and their standard deviations were determined as follows: $a_0 = 1.52 \pm 0.01$, $a_1 = 0.00314 \pm 0.00001$, $a_2 = -0.438 \pm 0.003$. That is, the ratio of the coefficients $a_0:a_1:a_2$ was substantially $1.52:0.00314:-0.438$. The correlation coefficients for LI and L were 0.87 and 0.57, respectively; the overall correlation coefficient was 0.97. The overall standard deviation for predicting $\Psi$ from LI and L was 0.3 arbitrary units.

If Eq. 1 is solved for L, L can be predicted within a standard deviation of 1 mm, nearly equal to the 0.9 mm resolution of arc length possible by analysis of video data. That is, regression analysis according to Eq. (1) shows that predicting the arc length L by measurement of the light intensity $\Psi$ is nearly as accurate as measuring L directly on a video image. It will be appreciated that the arc light intensity $\Psi$ may be measured readily in production welding equipment, while high speed video equipment is suitable only for laboratory use. Hence, measurement of the arc light intensity according to the invention allows practical production-line welding equipment to provide control sophistication responsive to measurement of welding parameters heretofore measurable only in laboratory tests. Moreover, the regression analysis confirms the results indicated by FIGS. 2-5 as discussed above, that is, the regression analysis demonstrates that the light intensity $\Psi$ is a meaningful indicator of arc length and is thus useful in controlling the welding process. Finally, Eq. (1) shows that the contribution of the arc current I to the arc light intensity $\Psi$ is distinguishable mathematically from the contribution of the arc length L, such that monitoring $\Psi$ and I rather than the arc voltage may be expected yield significantly more useful results.

More particularly, the conclusion that the arc light intensity is proportional to both the arc length and to the product of arc current and arc length as indicated by Eq. 1 allows one to determine the actual voltage across the arc $V_A$ as a function of arc length and arc current, that is, by monitoring $\Psi$ and I. Moreover, in accordance with the results shown in FIGS. 2-5 and 7, the mode of metal transfer as well as the overall conformity of the welding process to the desired welding parameters may be determined responsive to measurement of the light intensity and/or its frequency of variation.

Figure 8:
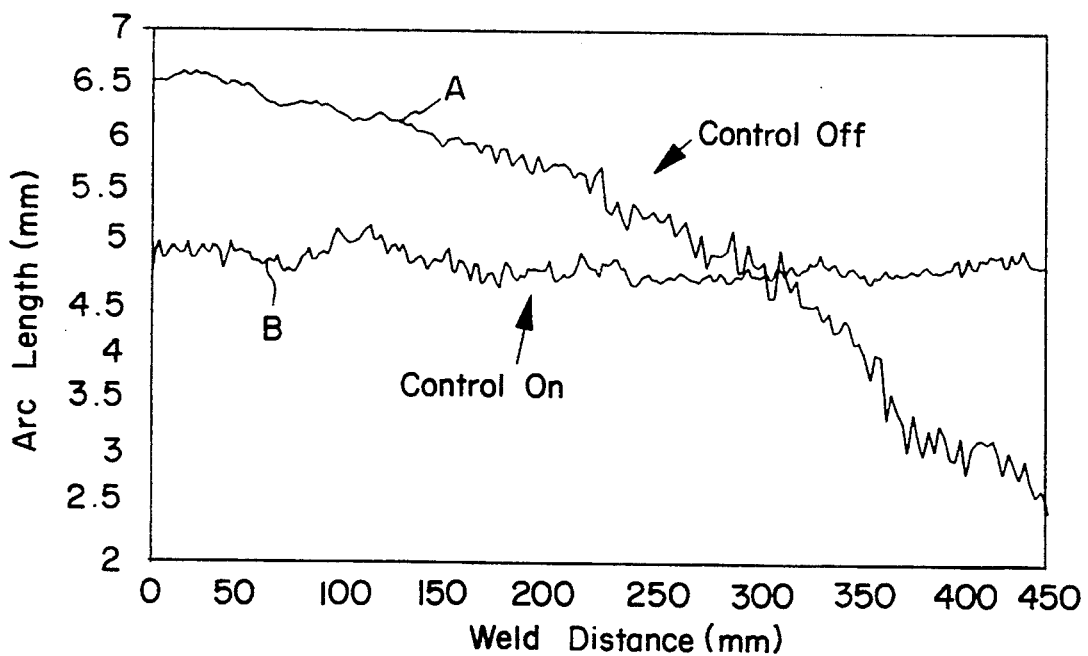
FIG. 8 shows a plot of the results of experiments performed using the apparatus of the invention, one experiment made with and one made without arc length control according to the invention.

FIG. 8 shows the results of experiments carried out using the apparatus of the invention. The experiments involved measurement of variation in arc length responsive to an intentional gradual change in CTWD. Experiments were carried out with and without arc length control responsive to measurement of the arc light intensity according to the invention. The results graphed in FIG. 8 show variation in arc length versus the distance traveled by the weld head along the workpiece; during this movement, the CTWD was gradually decreased- With the arc length control according to the invention disabled (Trace A), the arc length decreased along the length of the weld from the original value of 6.5 mm to 2.5 mm. With the arc length control according to the invention operating (Trace B), the arc length was maintained at the predetermined value of 5 mm regardless of the gradual change in CTWD along the length of the weld. The results of FIG. 8 thus illustrate the utility of measuring the arc light intensity according to the invention, and controlling the arc length responsive thereto.

Having thus described the invention, certain instructive comparisons to the prior art may be made. It will be appreciated that measurement of the arc light intensity in a gas metal arc or other consumable metal electrode welding process and using the measured light intensity to determine the mode of metal transfer and to determine the conformity of the welding process to the predetermined desired parameters according to the invention is distinct from the practice of the prior art. More specifically, U.S. Pat. No. 3,262,006 to Sciaky et al teaches a welding control system wherein the spacing of a non-consumable electrode from the workpiece in a so-called gas tungsten arc welding (GTAW) process (also known as tungsten-inert gas (TIG) welding) is adjusted responsive to measurement of the arc light intensity. It will be appreciated by those of skill in the art that the GTAW and GMAW processes differ in a very fundamental manner; namely, in the latter the electrode is consumed, while in the former the electrode is not consumed but is stable. Accordingly, since in GMAW the electrode is being advanced continually by the driving mechanism, the arc length tends to vary significantly. By comparison, while as discussed by Sciaky et al the non-consumable electrode used in GTAW may move up and down slightly (principally as the welding apparatus moves with respect to the workpiece), this motion is of very low frequency as compared to the continuous rapid changes in arc length encountered in GMAW, as shown in FIG. 2. A slowly responding device for adjusting the electrode height as shown by Sciaky et al thus does not suggest controlling, for example, the electrode feed rate, the welding current, or the arc voltage in a GMAW system responsive to measurement of the light intensity, as disclosed and claimed herein.

U.S. Pat. No. 3,236,977 to Johnson et al teaches sensing the arc light intensity for controlling arc length in GMAW. The Johnson et al system does not, however, measure the effect of changes in arc current on the intensity arc light for a given arc length. Therefore the Johnson et al system cannot discriminate between changes in arc light due to variation in the arc current from changes in arc light intensity due to changes in arc length, as provided by the system of the invention. Further, Johnson et al do not teach determination of the mode of metal transfer.

U.S. Pat. No. 4,093,844 to Fellure shows a system comprising a video camera to "optically" sense the arc and a controller device to accordingly determine the arc length. This information is then used to control the power level of a welding power supply, the spacing of the welding head from the workpiece, the feed speed of the electrode, or the feed speed of an auxiliary filler wire. See column 2, lines 42-48. Thus measuring the length of the arc using a video camera is a very complicated and awkward step which would be difficult if not impossible to implement in most commercial welding installations. By comparison, measuring the light intensity using a simple photodiode or the like according to the present invention can readily be implemented in and perhaps even be retrofitted to many welding control systems. Moreover, Fellure et al do not suggest that the light intensity be measured per se or that the light intensity might be used to determine the mode of metal transfer or to distinguish between the actual arc length and the welding current as discussed herein.

It should be appreciated as well that the methods of statistical analysis of welding process parameters disclosed in the parent application are applicable to the improvements first disclosed and claimed in this present continuation-in-part application. Therefore, the disclosure of the parent application is incorporated herein by reference. Further, it will be understood that reference in the appended claims to analysis of the welding process responsive to measurement of the arc light intensity is intended to include statistical analysis generally as described in the parent application.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A method for analyzing an electric arc welding process employing a consumable electrode, said welding process comprising the steps of:

advancing a continuous consumable electrode to a welding location on a workpiece; and connecting an output of a welding power supply providing a nominal output welding voltage and welding current between an electrode contact member in electrical contact with the electrode and the workpiece, such that a light-emitting arc exists between the electrode and the workpiece and the metal of the electrode is deposited on the workpiece as the electrode is advanced toward the welding location;

wherein said method of analyzing comprises the steps of:

disposing a light-sensitive sensor in the vicinity of the arc, such that light from the arc is incident on the sensor, and whereby the sensor provides an output signal responsive to the intensity $\Psi$ of light from the arc;

monitoring one or both of the welding current supplied to the arc and the welding voltage across the electrode contact member and the workpiece; and analyzing said output signal from said sensor and said one or both of said monitored current and/or voltage to determine the mode of metal transfer from said electrode to said workpiece.

2. The method of claim 1, wherein said step of analyzing said output signal from said sensor and one or both of said monitored current and/or voltage to determine the mode of metal transfer from said electrode to said workpiece is performed by determining the length L of the arc responsive to measurement of the light intensity $\Psi$.

3. The method of claim 2, wherein said step of determining the length L of the arc responsive to measurement of the light intensity $\Psi$ is performed responsive to measurement of the light intensity $\Psi$ and the arc current I.

4. The method of claim 3, wherein said step of determining the length L of the arc responsive to measurement of the light intensity $\Psi$ is performed by solution of the following equation:

$$\Psi = a_0 + a_1 L I + a_2 L$$

wherein $a_0$, $a_1$, and $a_2$ are fixed coefficients.

5. The method of claim 4, wherein the ratio of $a_0 : a_1 : a_2$ is typically $1.52 : 0.00314 : -0.438$.

6. A method for electric arc welding employing a consumable electrode, comprising the steps of:

advancing a continuous consumable electrode to a welding location on a workpiece;

connecting the output of a welding power supply providing a nominal output welding voltage and current between an electrode contact member in electrical contact with the electrode and the workpiece, such that a light-emitting arc exists between the electrode and the workpiece and the metal of the electrode is deposited on the workpiece as the electrode is advanced toward the welding location;

disposing a light-sensitive sensor in the vicinity of the arc, such that light emitted by the arc is incident on the sensor, and whereby the sensor provides an output signal responsive to the intensity $\Psi$ of light emitted by the arc;

monitoring one or both of the welding current supplied to the arc and the welding voltage across the electrode contact member and the workpiece;

analyzing said output signal from said sensor and said monitored one or both of the welding current and welding voltage to determine whether metal transfer from said electrode to said workpiece is proceeding in a desired manner; and controlling one or more of the welding current, welding voltage, and electrode feed rate responsive to said analyzing step.

7. The method of claim 6, wherein said step of analyzing comprises the step of determining the mode of metal transfer from said electrode to said workpiece.

8. The method of claim 6, wherein said step of analyzing said output signal from said sensor and one or both of said monitored current and/or voltage is performed by determining the length L of the arc responsive to measurement of the light intensity $\Psi$.

9. The method of claim 8, wherein said step of determining the length L of the arc responsive to measurement of the light intensity $\Psi$ is performed responsive to measurement of the light intensity $\Psi$ and the arc current I.

10. The method of claim 9, wherein said step of determining the length L of the arc responsive to measurement of the light intensity $\Psi$ and the arc current I is performed by solution of the following equation:

$$\Psi = a_0 + a_1 L I + a_2 L$$

wherein $a_0$, $a_1$, and $a_2$ are fixed coefficients.

11. The method of claim 10, wherein the ratio of $a_0 : a_1 : a_2$ is substantially $1.52 : 0.00314 : -0,438$.

12. Apparatus for electric arc welding employing a continuous consumable electrode, comprising:

means for advancing a continuous consumable metallic electrode to a contact element disposed at a welding location on a workpiece at a predetermined feed rate;

a welding power supply providing a nominal output welding voltage and welding current connected between said contact element and the workpiece, such that a light-emitting arc exists between the electrode and the workpiece, and the metal of the electrode is deposited on the workpiece as the electrode is advanced toward the welding location;

a sensor disposed in the vicinity of the arc, such that light emitted by the arc is incident on the sensor, said sensor providing an output signal responsive to the intensity $\Psi$ of light emitted by the arc;

means for monitoring one or both of the welding current supplied to the arc and the welding voltage across the electrode contact member and the workpiece; and means for analyzing said output signal from said sensor and said one or both of said monitored current and/or voltage to determine the mode of metal transfer from said electrode to said workpiece.

13. The apparatus of claim 12, wherein said means for analyzing said output signal from said sensor and one or both of said monitored current and/or voltage to determine the mode of metal transfer from said electrode to said workpiece comprises means for determining the length L of the arc responsive to measurement of the light intensity $\Psi$.

14. The apparatus of claim 13, wherein said means for determining the length L of the arc responsive to measurement of the light intensity $\Psi$ makes said determination responsive to measurement of the light intensity $\Psi$ and the arc current I.

15. The apparatus of claim 14, wherein said means for determining the length L of the arc responsive to measurement of the light intensity $\Psi$ effectively determines the solution of the following equation:

$$\Psi = a_0 + a_1 LI + a_2 L$$

wherein $a_0$, $a_1$, and $a_2$ are fixed coefficients.

16. The apparatus of claim 15, wherein the ratio $a_0:a_1:a_2$ is substantially $1.52:0.00314:-0.438$.

* * * * *